Patented May 9, 1939

2,157,391

UNITED STATES PATENT OFFICE 2,157,391

CATALYTIC REDUCTION OF NITRO COMPOUNDS

Byron M. Vanderbilt, Terre Haute, Ind., assignor to Commercial Solvents Corporation, Terre Haute, Ind., a corporation of Maryland No Drawing. Application August 13, 1937, Serial No. 158,960

15 Claims. (Cl. 260—584)

My invention relates to the production of amino-hydroxy compounds. More specifically, my invention relates to certain improvements in the production of aliphatic mono and polyhydric aminoalcohols by the catalytic hydrogenation of the corresponding nitro compounds.

The aliphatic nitrohydroxy compounds are at present readily available and may be prepared according to any of the known methods. The aliphatic mono and polyhydric nitroalcohols are most suitably prepared by the method of copending application Serial No. 146,855 by B. M. Vanderbilt, filed June 7, 1937, which comprises reacting a primary or secondary nitroparaffin with aldehydes under suitably controlled conditions in the presence of a common solvent, such as ethyl alcohol, and in the presence of an alkaline catalyst such as sodium hydroxide, the aldehyde being slowly added to a solution of the nitroparaffin and catalyst in the auxiliary solvent while thoroughly agitating. These and other similar types of nitrohydroxy compounds may be readily hydrogenated to amino compounds in the presence of a catalyst under suitable conditions as disclosed in copending application Serial No. 159,869 filed August 19, 1937. According to this process the nitrohydroxy compounds are hydrogenated, preferably at temperatures under 60° C., in the liquid phase in the presence of a nickel catalyst at atmospheric or increased pressures. The conversion of the nitro compounds to basic compounds ranges from 80 to 98%. However, in most instances the basic compounds produced do not constitute solely the aminohydroxy compounds corresponding to the nitrohydroxy compounds hydrogenated since relatively large amounts of alkyl amines and other reduction products are also formed during the hydrogenation. I believe that the formation of these relatively large amounts of alkyl amines and other undesirable reduction products may be attributed to the fact that the original nitrohydroxy compounds are unstable in basic solutions, and the formation of basic amino and hydroxylamino compounds at the beginning of the hydrogenation reaction tends to cause a decomposition of the original nitro compounds, the decomposition products then being hydrogenated as well as the original nitro compound.

I have now found that by carrying out the hydrogenation of the nitrohydroxy compound in the presence of a substantial amount of carbon dioxide, greatly improved yields of corresponding aminohydroxy and, in some instances, of the hydroxylamino hydroxy compounds are obtainable. The carbon dioxide functions to neutralize the basic compounds as they are formed, thus resulting in the production of carbonic acid salts of the amino or hydroxylamino compounds and the resulting solution does not become basic to any appreciable extent. The decomposition of the nitrohydroxy compound in solution does not occur to such an extent as in the cases where no neutralizing agent is added to the mixture being hydrogenated. The use of carbon dioxide in my process has a distinct advantage over other acidic substances that may be used in that it may be readily removed from the amino or hydroxylamino compounds by simple heating of the carbonic acid salt, thus liberating the free amino-hydroxy or hydroxylamino compound and carbon dioxide. A further advantage in the use of carbon dioxide is that it is inert to the catalyst and other materials in the reaction mixture.

For the hydrogenation of nitro compounds according to my invention, I may use the method disclosed in copending application Serial No. 159,869 and carry out the reaction in the presence of a substantial amount of carbon dioxide. My invention may be illustrated by the following general procedure: The nitro compound, catalyst, and solid carbon dioxide are introduced into a hydrogenation apparatus with or without a suitable solvent such as ethyl or methyl alcohol. A suitable pressure hydrogenation apparatus is one of the Adkins type which comprises a cylindrical steel reaction vessel fitted with flexible tubing for the introduction of hydrogen under pressure. The apparatus may be equipped with an electrical heating coil in order that the hydrogenation may be carried out at elevated temperatures, if desired. In general, any hydrogenation catalyst may be used that is active within the temperature range employed. I prefer, however, to use a finely divided nickel catalyst prepared in the following manner: A nickel-aluminum alloy is prepared in finely divided form, a suitable alloy containing 50 percent aluminum and 50 percent nickel. The aluminum is dissolved out of the powdered alloy by strong alkali solution and the nickel residue is washed free from alkali and salts with water and kept under liquid. This catalyst is active around 25° C. and may be used repeatedly without inactivation. The carbon dioxide may be introduced into the reaction mixture in any desired manner in the gaseous, liquid or solid state. For example, a convenient method consists of introducing it into the apparatus in the solid form immediately before sealing the apparatus. The amount of carbon dioxide introduced into the reaction is not critical, but in general it is desirable to add an amount in excess of that required to form the carbonic acid salts of the nitrogen bases formed during the hydrogenation. Hydrogen is introduced into the apparatus such that the hydrogen pressure may vary from atmospheric to over 2000 pounds per square inch. In general, I prefer to use pressures ranging from 300 to 1000 pounds per square inch, but it is to be understood that any hydrogen pressure may be employed. The hydrogenation is preferably carried out at temperatures below 60° C. with constant agitation for from one to four hours. The reaction is exothermic and hence in the initial stage it is often necessary to cool the apparatus so that appreciable decomposition of the nitro compound does not occur. The temperature may also be regulated by the rate and pressure at which the hydrogen is introduced into the system.

After the hydrogenation is complete the reaction mixture is removed from the apparatus and the catalysts separated by filtration or other suitable method. The carbonic acid salt of the desired aminohydroxy or hydroxylamino hydroxy compound may be purified by fractional crystallization from a suitable solvent or other suitable method, or the free base may be obtained by fractional distillation of the hydrogenated solution since the carbonic acid salts of the aminohydroxy and hydroxylamino hydroxy compounds are in general thermally decomposed at temperatures lower than the boiling points of the corresponding free bases.

The following specific examples are given in order to illustrate this procedure:

*Example I*

One hundred and sixty-one parts by weight of 3-nitro-4-heptanol were mixed with 320 parts of methyl alcohol and 7½ parts of a nickel catalyst prepared as described in the foregoing, and the mixture was introduced into a hydrogenation apparatus with 100 parts of solid carbon dioxide and sealed. The apparatus and reaction mixture were allowed to come to room temperature, the pressure of carbon dioxide within the apparatus being 125 pounds per square inch before introduction of the hydrogen. The hydrogen was then introduced into the apparatus such that the total pressure of hydrogen and carbon dioxide within the apparatus was maintained at 600 pounds per square inch. The apparatus was constantly agitated during the addition of the hydrogen, which took place at room temperature, for a period of 2½ hours. At the conclusion of the hydrogenation the reaction mixture was removed from the hydrogenation apparatus and the catalyst separated from the solution by filtration. Titration of the solution showed an 80% conversion of the nitroalcohol to base. The solution was subjected to fractional distillation during which procedure the carbon dioxide, which had been fixed as the amine salt, was liberated. The fraction boiling at 105 to 110° C. at approximately 30 millimeters of mercury pressure was taken off in an amount which indicated an 81.5% yield of 3-amino-4-heptanol from the 3-nitro-4-heptanol, i. e., 65% based on the amount of 3-nitro-4-heptanol used.

*Example II*

One hundred parts by weight of 2-ethyl-2-nitro-1, 3-propanediol were dissolved in 246 parts of 90% aqueous methanol. This solution was introduced into the hydrogenation apparatus with 90 parts of solid carbon dioxide and 7½ parts of nickel catalyst. After allowing the apparatus to come to room temperature the carbon dioxide exerted a pressure of 80 to 90 pounds per square inch. Hydrogen was then introduced as in the previous example such that the initial total pressure within the apparatus was about 300 pounds per square inch and at such a rate that the reaction temperature did not exceed 40° C. When the exothermic reaction ceased a total of 1000 pounds pressure was applied and the apparatus heated externally to 50° C. and maintained at this temperature for one hour with continual agitation. The apparatus was then allowed to cool to room temperature and the reaction product removed. After separating the catalyst by filtration, the reaction mixture was subjected to fractional distillation. A 91.5% yield of 2-amino-2-ethyl-1, 3-propanediol, based on the total amount of nitroglycol used, boiling above 125° C. at 7 millimeters pressure was obtained.

My invention may be suitably employed in the hydrogenation of any of the nitrohydroxy compounds or other nitro compounds, being particularly useful in those cases wherein the nitro compound being hydrogenated is not stable in basic solutions. For example, the nitroalcohols, the nitroglycols, the nitro trihydroxy compounds and various other substituted nitro compounds may be hydrogenated according to my improved process.

I do not wish to be limited in any manner by the procedure outlined in the above examples. Many variations will readily occur to those skilled in the art, such as, for example, carrying out the hydrogenation at atmospheric pressures under suitable conditions, introducing the carbon dioxide into the reaction in the gaseous state separately or mixed with the hydrogen, employing different catalysts, solvents, temperatures and time of reaction depending on the nitro compound being hydrogenated, etc. Further variations apparent to those skilled in the art are also included within the scope of my invention.

What I claim is:

1. In a process for the catalytic hydrogenation of aliphatic nitro compounds to the corresponding primary aliphatic amine, the improvement which comprises effecting the hydrogenation in the presence of carbon dioxide at temperatures below which the carbonates of the basic nitrogen compounds are unstable.

2. In a process for the catalytic hydrogenation of aliphatic nitrohydroxy compounds to the corresponding primary aliphatic amine, the improvement which comprises effecting the hydrogenation in the presence of carbon dioxide at temperatures below which the carbonates of the basic nitrogen compounds are unstable.

3. In a process for the catalytic hydrogenation of mono and polyhydric aliphatic nitroalcohols to the corresponding primary aliphatic amine, the improvement which comprises effecting the hydrogenation in the presence of carbon dioxide at temperatures below which the carbonates of the basic nitrogen compounds are unstable.

4. In a process for the catalytic hydrogenation of aliphatic nitroalcohols to the corresponding primary aliphatic amine, the improvement which comprises effecting the hydrogenation in the presence of carbon dioxide at temperatures below which the carbonates of the basic nitrogen compounds are unstable.

5. In a process for the catalytic hydrogenation of aliphatic nitroglycols to the corresponding primary aliphatic amine compounds, the improvement which comprises effecting the hydrogenation in the presence of carbon dioxide at temperatures below which the carbonates of the basic nitrogen compounds are unstable.

6. In a process for the catalytic hydrogenation of aliphatic nitrohydroxy compounds to aminohydroxy compounds, the improvement which comprises effecting the hydrogenation in the presence of carbon dioxide at temperatures below which the carbonates of the aminohydroxy compounds are unstable.

7. In a process for the catalytic hydrogenation of mono and polyhydric aliphatic nitroalcohols to the corresponding aminoalcohols, the improvement which comprises effecting the hydrogenation in the presence of carbon dioxide at temperatures below which the carbonates of the aminoalcohols are unstable.

8. In a process for the catalytic hydrogenation of aliphatic nitroglycols to aminoglycols, the improvement which comprises effecting the hydrogenation in the presence of carbon dioxide at temperatures below which the carbonates of the aminoglycols are unstable.

9. In a process for the catalytic hydrogenation of mono and polyhydric aliphatic nitroalcohols to aminoalcohols, the improvement which comprises effecting the hydrogenation in the presence of carbon dioxide in an amount at least equal to that required to form carbonic acid salts of the basic nitrogen compounds produced, and at temperatures below which the carbonates of the basic nitrogen compounds are unstable.

10. In a process for the catalytic hydrogenation of mono and polyhydric aliphatic nitroalcohols to aminoalcohols, the improvement which comprises effecting the hydrogenation in the presence of carbon dioxide in an amount at least equal to that required to form the carbonic acid salts of the basic nitrogen compounds produced, and at temperatures below which the carbonates of the basic nitrogen compounds are unstable, and subsequently decomposing the carbonic acid salts by the application of heat wherein the basic nitrogen compounds are liberated.

11. In a process for the catalytic hydrogenation of aliphatic nitroalcohols to aminoalcohols, the improvement which comprises effecting the hydrogenation in the presence of carbon dioxide in an amount at least equal to that required to form carbonic acid salts of the basic nitrogen compounds produced, and at temperatures below which the carbonates of the basic nitrogen compounds are unstable.

12. In a process for the catalytic hydrogenation of aliphatic nitroalcohols to aminoalcohols, the improvement which comprises effecting the hydrogenation in the presence of carbon dioxide in an amount at least equal to that required to form the carbonic acid salts of the basic nitrogen compounds produced, and at temperatures below which the carbonates of the basic nitrogen compounds are unstable, and subsequently decomposing the carbonic acid salts by the application of heat wherein the basic nitrogen compounds are liberated.

13. In a process for the catalytic hydrogenation of aliphatic nitroglycols to aminoglycols, the improvement which comprises effecting the hydrogenation in the presence of carbon dioxide in an amount at least equal to that required to form the carbonic acid salts of the basic nitrogen compounds produced and at temperatures below which the carbonates of the basic nitrogen compounds are unstable.

14. In a process for the catalytic hydrogenation of aliphatic nitroglycols to aminoglycols, the improvement which comprises effecting the hydrogenation in the presence of carbon dioxide in an amount at least equal to that required to form the carbonic acid salts of the basic nitrogen compounds produced, and at temperatures below which the carbonates of the basic nitrogen compounds are unstable, and subsequently decomposing the carbonic acid salts by the application of heat wherein the basic nitrogen compounds are liberated.

15. In a process for the catalytic hydrogenation of mono and polyhydric aliphatic nitroalcohols to the corresponding primary aliphatic amine, the improvement which comprises effecting the hydrogenation in the presence of carbon dioxide at temperatures below which the carbonates of the basic nitrogen compounds are unstable and in the presence of a solvent for the basic nitrogen carbonates produced.

BYRON M. VANDERBILT.